United States Patent Office 2,826,562
Patented Mar. 11, 1958

---

2,826,562

HYDROXY - SUBSTITUTED UNSATURATED ESTERS PREPARED FROM POLYEPOXIDES AND DERIVATIVES THEREOF

Edward C. Shokal, Walnut Creek, Calif., assignor to Shell Development Company, Emeryville, Calif., a corporation of Delaware No Drawing. Application September 28, 1953
Serial No. 382,870

13 Claims. (Cl. 260—58)

This invention relates to a new class of organic esters and to their preparation. More particularly, the invention relates to new hydroxy-substituted unsaturated esters obtained by reacting polyepoxides with unsaturated acid esters, to derivatives thereof, and to the use of the esters and derivatives, particularly in the preparation of coating compositions and as plasticizers and lubricants.

Specifically, the invention provides new and particularly useful hydroxy-substituted ethylenically unsaturated esters which are easily obtained by contacting a polyepoxide, and preferably a low molecular weight glycidyl polyether of a polyhydric phenol or polyhydric alcohol, with an acid ester of (1) a polybasic acid and (2) an ethylenically unsaturated alcohol. The invention also provides derivatives of these hydroxy-substituted ethylenically unsaturated esters, and particularly those obtained by reacting the polyfunctional esters with acids, isocyanates, mercaptans and the like. The invention further provides addition polymers of these ethylenically unsaturated esters which may be obtained by polymerizing the said esters by themselves or with other ethylenically unsaturated compounds.

It is an object of the invention to provide a new class of esters and a method for their preparation. It is a further object to provide hydroxy-substituted unsaturated esters which may be easily prepared from polyepoxides and unsaturated acid esters. It is a further object to provide novel hydroxy-substituted unsaturated esters which are particularly useful and valuable in the preparation of air-drying coating compositions such as varnishes, paints and the like. It is a further object to provide novel hydroxy-substituted unsaturated esters which may be used directly as varnishes without the addition of solvents. It is a further object to provide hydroxy-substituted unsaturated esters which may be further reacted through the hydroxy groups or unsaturated linkages to form coatings which are hard and flexible. It is a further object to provide novel hydroxy-substituted unsaturated esters which may be polymerized with ethylenically unsaturated monomers to form hard resistant resins. It is a further object to provide derivatives of the hydroxy-substituted unsaturated esters such as their ester and ether derivatives which are useful as plasticizers and lubricants. Other objects and advantages of the invention will be apparent from the following detailed description thereof.

It has now been discovered that these and other objects may be accomplished by novel hydroxy-substituted ethylenically unsaturated esters which are easily obtained by contacting polyepoxides, and particularly the glycidyl polyethers of polyhydric phenols or polyhydric alcohols, with acid esters of (1) polybasic acid and (2) ethylenically unsaturated alcohols, and particularly the allylic alcohols. It has been found that polyepoxides and the above-noted unsaturated acid esters readily react in the absence of catalyst, and in many cases without the application of heat, to form valuable products having a hydroxy group attached to one aliphatic carbon atom and an ester group derived from the unsaturated acid ester attached to the adjacent aliphatic carbon atom. The hydroxy-substituted ethylenically unsaturated esters prepared in this manner have been found to possess surprisingly good air-drying properties and are useful in the preparation of coating compositions, such as varnishes, paints and the like. The liquid hydroxy-substituted ethylenically unsaturated esters, and particularly those prepared from the glycidyl polyethers of polyhydric phenols or polyhydric alcohols having a molecular weight below about 800, have viscosities such that they may be used directly as varnishes without the addition of solvents or diluents. The novel hydroxy-substituted ethylenically unsaturated esters of the invention may also be further reacted through the hydroxy group, such as with polyisocyanates, polycarboxylic acids or urea resins, or through the ethylenic group, such as with hydrogen sulfide, mercaptans, and the like, to produce coatings which have improved hardness and flexibility and good resistance to chemicals. The hydroxy-substituted ethylenically unsaturated esters as well as substituted ethylenically unsaturated esters as well as their derivatives prepared from monocarboxylic acids or monohydric alcohols are also of great value as polymerizable plasticizers for polymers such as the polymers of vinyl chloride, and may be used with these polymers in preparing improved plastisol and organosol compositions.

It has also been found that when the novel hydroxy-substituted ethylenically unsaturated esters and many of their derivatives are heated with free radical yielding catalysts, such as peroxide catalysts, they form hard resins having many of the characteristics of the polymers of the polyepoxides from which they are derived. As indicated hereinafter, valuable polymers of these type are also obtained by copolymerizing the novel hydroxy-substituted ethylenically unsaturated esters with other dissimilar monomers as vinyl chloride, acrylonitrile, allyl acetate, vinyl acetate, styrene, alpha-methyl styrene, diallyl phthalate, diallyl adipate, and the like.

The polyepoxides used in the preparation of the novel esters of the invention comprise those organic compounds possessing at least two reactive epoxy (i. e.

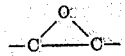

groups) in their molecule. The polyepoxides may be saturated or unsaturated, aliphatic cycloaliphatic, aromatic or heterocyclic and may be substituted if desired with non-interfering substituents. The polyepoxides may be monomeric or polymeric and preferably have a molecular weight between 125 and 3000.

For clarity, many of the polyepoxides will be referred to hereinafter in terms of their epoxy equivalency. The term "epoxy equivalency" refers to the number of epoxy groups contained in the average molecular of the desired material. The epoxy equivalency is obtained by dividing the average molecular weight of the polyepoxides by the epoxide equivalent weight. The epoxide equivalent weight is determined by heating one-gram sample of the polyepoxide with an excess of pyridinium chloride dissolved in pyridine at the boiling point for twenty minutes. The excess pyridinium chloride is then back titrated with 0.1N sodium hydroxide to phenolphthalein end point. The epoxide value is calculated by considering one HCl as an equivalent of one epoxide. This method is used to obtain all epoxide values reported herein.

If the polyepoxide material consists of a single compound and all of the epoxy groups are intact the epoxy equivalency will be integers, such as 2, 3, 4 and the like. However, in the case of polymeric-type polyepoxides many of the materials may contain some of the monomeric monoepoxides or have some of their epoxy groups hydrated or otherwise reacted and/or contain macromolecules of somewhat different molecular weight so the epoxy equivalency may be quite low and containing fractional values. The polymeric material may, for example, have an epoxy equivalency of 1.5, 1.8, 2.5, and the like.

The polyepoxides may be exemplified by the following: vinyl cyclohexane dioxide, epoxidized mono-, di- and triglycerides, butadiene dioxide, 1,4-bis(2,3-epoxypropoxy)benzene, 1,3-bis(2,3-epoxypropoxy)-benzene, 4,4'-bis(2,3-epoxypropoxy)diphenyl ether, 1,8-bis(2,3-epoxypropoxy)octane, 1,4-bis(2,3-epoxypropoxy)cyclohexane, 4,4'-bis(2-hydroxy-3,4-epoxybutoxy) diphenyldimethylmethane, 1,3-bis(4,5-epoxypentoxy) - 5 - chlorobenzene, 1,4-bis(3,4-epoxybutoxy)2-chlorocyclohexane, diglycidyl thioether, diglycidyl ether, ethylene glycol diglycidyl ether, resorcinol diglycidyl ether, 1,2,5,6-diepoxyhexyne-3, 1,2,5,6-diepoxyhexane, and 1,2,3,4-tetra(2-hydroxy-3,4-epoxybutoxy)butane.

Other examples include the glycidyl polyethers of polyhydric phenols obtained by reacting a polyhydric phenol with an excess, e. g., 4 to 8 mol excess, of a chlorohydrin, such as epichlorohydrin and diglycerol chlorohydrin. Thus, polyether A described hereinafter, which is substantially 2,2-bis(2,3-epoxypropoxyphenyl)propane is obtained by reacting bis-phenol 2,2-bis(4-hydroxyphenyl)-propane with an excess of epichlorohydrin in an alkaline medium. Other polyhydric phenols that can be used for this purpose include resorcinol, catechol, hydroquinone, methyl resorcinol, or polynuclear phenols, such as 2,2-bis(4 - hydroxyphenyl)butane, 4,4' - dihydroxy - benzophenone, bis(4-hydroxyphenyl)ethane, and 1,5-dihydronaphthalene.

Still a further group of the polyepoxides comprises the polyepoxy polyethers obtained by reacting, preferably in the presence of an acid-acting compound, such as hydrofluoric acid, one of the afore-described halogen-containing epoxides with a polyhydric alcohol, and subsequently treating the resulting product with an alkaline component. Polyhydric alcohols that may be used for this purpose include glycerol, proylene glycol, ethylene glycol, diethylene glycol, butylene glycol, hexanetriol, sorbitol, mannitol, pentanetriol, pentaerythritol, di- and tripentaerythritol, polyglycerol, dulictol, inositol, carbohydrates, methyltrimethylolpropane, 2,6-octanediol, 1,2,4,5-tetrahydroxycyclohexane, 2-ethylhexanetriol-1,2,6, glycerol methyl ether, glycerol allyl ether, polyvinyl alcohol and polyallyl alcohol, and mixtures thereof. Such polyepoxides may be exemplified by glycerol triglylcidyl ether, mannitol tetraglycidyl ether, pentaerythritol tetraglycidyl ether and sorbitol tetraglycidyl ether.

A further group of the polyepoxides comprises the polyepoxy polyesters obtained by esterifying a polycarboxylic acid with an epoxy-containing alcohol, such as, for example, the diglycidyl ester of adipic acid, diglycidyl ester of malonic acid, and the diglycidyl ester of succinic acid.

Other polyepoxides include the polyepoxypolyhydroxy to polyethers obtained by reacting, preferably in an alkaline medium, a polyhydric alcohol or polyhydric phenol with a polyepoxide, such as the reaction product of glycerol and bis(2,3-epoxypropyl)ether, the reaction product of sorbitol and bis(2,3-epoxy-2-methylpropyl)ether, the reaction product of pentaerythritol and 1,2-epoxy-4,5-epoxypentane, and the reaction product of bis-phenol and bis(2,3-epoxy-2-methylpropyl)ether, the reaction product of resorcinol and bis(2,3-epoxypropyl)ether, and the reaction product of catechol and bis(2,3-epoxypropyl)-ether.

A group of polymeric-type polyepoxides comprises the hydroxy-substituted polypoxy polyethers obtained by reacting, preferably in an alkaline medium, a slight excess, e. g., .5 to 3 mol excess, of a halogen-containing epoxide as described above, with any of the afore-described polyhydric phenols, such as resorcinol, catechol, bis-phenol, bis [4-(2'-hydroxynaphth-1-yl)-2-2-hydroxynaphth-1-yl] methane and the like.

Other polymeric polyepoxides include the polymers and copolymers of the epoxy-containing monomers possessing at least one polymerizable ethylenic linkage. When this type of monomer is polymerized in the substantial absence of alkaline or acidic catalysts, such as in the presence of heat, oxygen, peroxy compounds, actinic light, and the like, they undergo addition polymerization at the multiple bond leaving the epoxy group unaffected. These monomers may be polymerized with themselves or with other ethylenically unsaturated monomers, such as styrene, vinyl acetate, methacrylonitrile, acrylonitrile, vinyl chloride, vinylidene chloride, methyl acrylate, methyl methacrylate, diallyl phthalate, vinyl allyl phthalate, divinyl adipate, 2-chloroallyl acetate, and vinyl methallyl pimelate. Illustrative examples of these polymers include poly-(allyl 2,3-epoxypropyl ether), poly(2,3-epoxypropyl crotonate), allyl 2,3-epoxypropyl ether-styrene, copolymer, methallyl 3,4-epoxybutyl ether-allyl benzoate copolymer, poly(vinyl 2-3-epoxypropyl)ether, allyl glycidyl ether-vinyl acetate copolymer and poly [4-(2',3'-glycidyloxy)-styrene].

Another group of polyepoxides that may be used in the preparation of the claimed polymerizable products are the glycidyl ethers of novolac resins which resins are obtained by condensing an aldehyde with a polyhydric phenol. A typical member of this class is the epoxy resin from formaldehyde/2,2-bis(4-hydroxyphenyl) propane novolac resin which contains as predominant constituent the substance represented by the formula

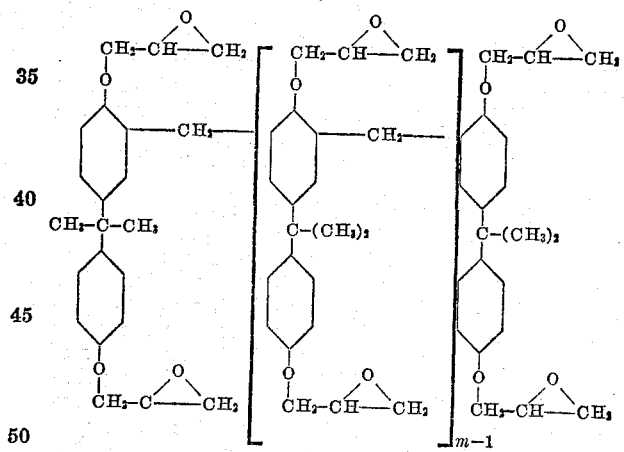

wherein $m$ is a value of at least 1.0. For the nature and preparation of novolac resins, see the book by T. S. Carswell, Phenoplasts, 1947, page 29 et seq.

Particularly preferred polyepoxides to be used in the preparation of the novel hydroxy-substituted esters of the present invention comprise the glycidyl polyethers of dihydric phenols obtained by reacting epichlorohydrin with a polyhydric phenol in an alkaline medium. The monomeric products of this type may be represented by the general formula

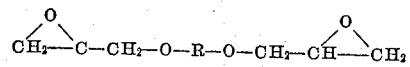

wherein R represents a divalent hydrocarbon radical of the dihydric phenol. The polymeric products will generally not be a single simple molecule but will be a complex mixture of glycidyl polyethers of the general formula

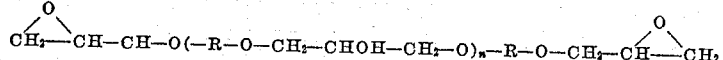

wherein R is a divalent hydrocarbon radical of the dihydric phenol and $n$ is an integer of the series 0, 2, 3, etc. While for any single molecule of the polyether $n$ is an integer, the fact that the obtained polyether is a mixture of compounds causes the determined value of $n$ to be an average which is not necessarily zero or a whole number. The polyethers may in some cases contain a very small amount of material with one or both of the terminal glydicyl radicals in hydrated form.

The afore-described preferred glycidyl polyethers of the dihydric phenols may be prepared by reacting the required proportions of the dihydric phenol and the epichlorohydrin in an alkaline medium. The desired alkalinity is obtained by adding basic substances, such as sodium or potassium hydroxide, preferably in stoichiometric excess to the epichlorohydrin. The reaction is preferably accomplished at temperatures within the range of from 50° C. to 150° C. The heating is continued for several hours to effect the reaction and the product is then washed free of salt and base.

The preparation of some of the glycidyl polyethers of the dihydric phenols will be illustrated below.

PREPARATION OF GLYCIDYL POLYETHERS OF DIHYDRIC PHENOLS

*Polyether A.*—About 2 mols of bis-phenol was dissolved in 10 mols of epichlorohydrin and 1 to 2% water added to the resulting mixture. The mixture was then brought to 80° C. and 4 mols of solid sodium hydroxide added in small portions over a period of about 1 hour. During the addition, the temperature of the mixture was held at about 90° C. to 110° C. After the sodium hydroxide had been added, the water formed in the reaction and most of the epichlorohydrin was distilled off. The residue that remained was combined with an approximately equal amount of benzene and the mixture filtered to remove the salt. The benzene was then removed to yield a viscous liquid having a viscosity of about 150 poises at 25° C. and a molecular weight of about 350 (measured ebullioscopically in ethylene dichloride). The product had an epoxy value of 0.50 eq./100 g., and an epoxy equivalency of 1.75. For convenience, this product will be referred to hereinafter as polyether A.

*Polyether B.*—A solution consisting of 11.7 parts of water, 1.22 parts of sodium hydroxide, and 13.38 parts of bis-phenol was prepared by heating the mixture of ingredients to 70° C. and then cooling to 46° C. at which temperature 14.06 parts of epichlorohydrin was added while agitating the mixture. After 25 minutes had elapsed, there was added during an additional 15 minutes' time a solution consisting of 5.62 parts of sodium hydroxide in 11.7 parts of water. This caused the temperature to rise to 63° C. Washing with water at 20° C. to 30° C. temperature was started 30 minutes later and continued for 4½ hours. The product was dried by heating to a final temperature of 140° C. in 80 minutes, and cooled rapidly. At room temperature the product was an extremely viscous semi-solid having a melting point of 27° C. by Durrans' Mercury Method and a molecular weight of 483. The product had an epoxy value of 0.40 eq./100 g., and an epoxy equivalency of 1.9. For convenience, this product will be referred to as polyether B.

*Polyether C.*—About 228 parts of bis-phenol and 84 parts sodium hydroxide as a 10% aqueous solution were combined and heated to about 45° C. whereupon 176 parts of epichlorohydrin was added rapidly. The temperature increased and remained at about 95° C. for 80 minutes. The mixture separated into a two-phase system and the aqueous layer is drawn off. The resinous layer that remained is washed with hot water and then drained and dried at 130° C. The Durrans' Mercury Method melting point of the resulting product is 52° C. and the molecular weight is about 710. The product has an epoxy value of 0.27 eq./100 g. and an epoxy equivalency of 1.9. For convenience, this product will be referred to as polyether C.

Particularly preferred members of the above-described group are the glycidyl polyethers of the dihydric phenols, and especially 2,2-bis(4-hydroxyphenyl)propane, having an epoxy equivalency between 1.1 and 2.0 and a molecular weight between 300 and 900. Particularly preferred are those having a Durrans' Mercury Method softening point below about 60° C.

The glycidyl polyethers of polyhydric phenols obtained by condensing the polyhydric phenols with epichlorohydrin are also referred to as "ethoxyline" resins. See Chemical Week, vol. 69, page 27, for September 8, 1951.

Also particularly preferred are the glycidyl polyethers of polyhydric alcohols which are obtained by reacting the polyhydric alcohol with epichlorohydrin, preferably in the presence of 0.1% to 5% by weight of an acid-acting compound, such as boron trifluoride, hydrofluoric acid or stannic chloride. This reaction is effected at about 50° C. to 125° C. with the proportions of reactants being such that there is about one mol of epichlorohydrin for every equivalent of hydroxyl group in the polyhydric alcohol. The resulting chlorohydrin ether is then dehydrochlorinated by heating at about 50° C. to 125° C. with a small, e. g., 10% stoichiometrical excess of a base, such as sodium aluminate.

The products obtained by the method shown in the preceding paragraph may be described as halogen-containing ether epoxide reaction mixtures and products are polyether polyepoxide reaction products which in general contain at least three non-cyclic ether (—O—) linkages, terminal epoxide-containing ether

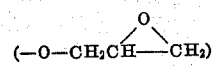

groups, and halogen attached to a carbon of an intermediate

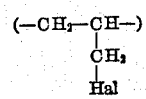

group.

These halogen-containing polyether polyepoxide reaction products, obtainable by partial dehydrohalogenation of polyhalohydrin alcohols may be considered to have the following general formula

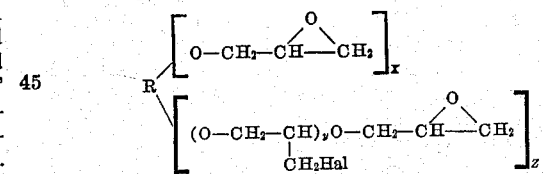

in which R is the residue of the polyhydric alcohol which may contain unreacted hydroxyl groups, X indicates one or more of the epoxy ether groups attached to the alcohol residue, y may be one or may vary in different reaction products of the reaction mixture from zero to more than one, and Z is one or more, and X+Z, in the case of products derived from polyhydric alcohols containing three or more hydroxyl groups, averages around two or more so that the reaction product contains on the average two or more than two terminal epoxide groups per molecule.

The preparation of one of these preferred polyglycidyl ethers of polyhydric alcohols may be illustrated by the following example showing the preparation of a glycidyl polyether of glycerol.

PREPARATION OF GLYCIDYL POLYETHERS OF POLYHYDRIC ALCOHOLS

*Polyether D.*—About 276 parts (3 mols) of glycerol was mixed with 832 parts (9 mols) of epichlorohydrin. To this reaction mixture was added 10 parts of diethyl ether solution containing about 4.5% boron trifluoride. The temperature of this mixture was between 50° C. and 75° C. for about three hours. About 370 parts of the resulting glycerol-epichlorohydrin condensate was dissolved in 900 parts of dioxane containing about 300 parts of sodium aluminate. While agitating, the reaction mixture was heated and refluxed at 93° C. for 9 hours. After cooling to atmospheric temperature, the insoluble material was filtered from the reaction mixture and low boiling substances removed by distillation to a temperature of about 150° C. at 20 mm. pressure. The polyglycidyl ether, in amount of 261 parts, was a pale yellow, viscous liquid. It had an epoxide value of 0.671 equivalent per 100 grams and the molecular weight was 324 as measured ebullioscopically in dioxane solution. The epoxy equivalency of this product was 2.13. For convenience, this product will be referred to hereinafter as polyether D.

Particularly preferred members of this group comprise the glycidyl polyethers of aliphatic polyhydric alcohols containing from 2 to 10 carbon atoms and having from 2 to 6 hydroxyl groups and more preferably the alkane polyols containing from 2 to 8 carbon atoms and having from 2 to 6 hydroxyl groups. Such products preferably have an epoxy equivalency greater than 1.0, and still more preferably between 1.1 and 4 and a molecular weight between 170 and 900.

Also preferred are the glycidyl ethers of novolac resins as described above. These novolac resin epoxides are obtained by condensing the novolac resin with at least about 3 mols of epichlorohydrin per phenolic hydroxy equivalent of novolac resin and then adding about one mol of alkali metal hydroxide per phenolic hydroxy equivalent of novolac resin. The mixture is maintained within the range of about 60° C. to 150° C. during the ensuing reaction. Upon completion of the reaction, the formed alkali metal salt and any unreacted hydroxide are removed from the resulting epoxy resin as are also unreacted excess epichlorohydrin and water, i. e., the formed epoxy resin is separated from the reaction mixture and purified.

Preparation of one such novolac resin is shown below.

PREPARATION OF A NOVOLAC RESIN EPOXIDE

A novolac resin having a molecular weight of 710 and a hydroxyl value of 0.192 hydroxyl equivalent per 100 grams was added to 920 parts of epichlorohydrin and 5 parts of water and the mixture heated to 80° C. whereupon 13 parts of a total of 82 parts of 98% sodium hydroxide pellets were added. The temperature rose to 107° C. and after it dropped to 95° C. another portion of 13 parts was added. Like portions were added at intervals of 10 minutes until all had been added. The mixture was then refluxed for an hour to insure completion of the reaction. The unreacted epichlorohydrin was distilled off. 440 parts of benzene added to precipitate salt and dissolve resin. The mixture filtered and benzene removed. Resulting resin was a solid which was soluble in benzene. Analysis gave results:

| | |
|---|---|
| Mol. weight | 835 |
| Epoxy value, eq./100 g | 0.410 |
| Hydroxyl value, eq./100 g | 0.172 |
| Chlorine, percent | 2.76 |
| Durrans' softening point, ° C | 62.5 |

This resin will be referred to hereinafter as polyether E.

The preparation of other novolac resin epoxide may be found in co-pending application Bradley et al., Serial No. 267,306, filed January 19, 1952.

Also preferred are the polymers and copolymers of the unsaturated epoxy-containing monomers, such as allyl glycidyl ether. These polymers are preferably prepared by heating the monomer or monomers in bulk or in the presence of an inert solvent such as benzene in the presence of air or a peroxy catalyst, such as ditertiary-butyl peroxide, at temperatures ranging generally from 75° C. to 200° C.

The preparation of polymers of this type may be illustrated by the following example showing the preparation of poly(allyl glycidyl ether).

PREPARATION OF POLYMERS OF GLYCIDYL ETHERS

Polymer F.—About 100 parts of allyl glycidyl ether was combined with an equal amount of benzene and the resulting mixture heated at 155° C. in the presence of 3% di-tertiary-butyl peroxide. The solvent and unreacted monomer were then removed by distillation. The poly(allyl glycidyl ether) obtained as the resulting product had a molecular weight of about 481–542 and an epoxide value of 0.50 eq./100 g. For convenience, this product will be referred to hereinafter as polymer F.

Particularly preferred members of the above-described group comprise the polymers of the 2-alkenyl glycidyl ethers having a molecular weight between 300 and 1000 and an epoxy equivalency greater than 1.0, and preferably between 1.2 and 6.0. Of special interest are the polyepoxides containing only carbon, hydrogen, oxygen and chlorine.

The unsaturated acid esters to be reacted with the above-described polyepoxides are obtained by esterifying at least one and at most all but one of the acid groups of a polybasic acid with an ethylenically unsaturated alcohol. The polybasic acids used for this purpose may be inorganic or organic and may be saturated or unsaturated, aliphatic, cycloaliphatic, aromatic or heterocyclic. Examples of these acids include, among others, inorganic acids as boric, silicic, titanic and phosphoric acid, organo-substituted phosphorous and silicon acids, such as benzenephosphonic acid and phenyltrihydroxy silane, and organic acids, such as oxalic, adipic, maleic, malonic, fumaric, glutaconic, tricarballylic, aconitic, itaconic, phthalic, terephthalic, isophthalic, diphenyldicarboxylic, 1,4 - cyclohexanedicarboxylic, 4 - cyclohexene - 1,2 - dicarboxylic, dimerized unsaturated fatty acids as dimerized linoleic acid, 3,5-dimethyl-4-cyclohexene-1,2-dicarboxylic, thiodipropionic, sulfonyldipropionic, oxydipropionic, oxydibutyric, 2,3-dimethylmaleic, 2-chloromaleic, 2-octenedioic, hydromuconic, 1,2,4-butanetricarboxylic, 1,3,5-pentanetricarboxylic, trimellitic, dinicotinic, citric, pimelic, tartaric, methoxysuccinic, quinolinic, and cinchomeronic acids, and the like.

Preferred acids to be used in preparing the acid esters are the polycarboxylic acids containing no more than 20 carbon atoms, and more particularly the aliphatic dicarboxylic acids and the aromatic dicarboxylic acids containing no more than 12 carbon atoms, such as malonic acid, succinic acid, phthalic acid, dichlorophthalic and tetrachlorophthalic and maleic acid, fumaric acid, terephthalic acid, tetrachloroterphthalic acid, glutaconic acid, itaconic acid, 2,3-dimethylmaleic acid, cyclohexanedicarboxylic acid, 4-cyclohexene-1,2-dicarboxylic acid, and 3,5-dimethylcyclohexane-1,2-dicarboxylic acid, citriconic and acetylene dicarboxylic acid.

Coming under special consideration are the ethylenically unsaturated polycarboxylic acids and their halogen-substituted derivatives and particularly the aliphatic monoethylenically unsaturated polycarboxylic acids and chloro-derivatives, such as the alkenedioic and chloro-substituted alkenedioic acids containing not more than 8 carbon atoms, as maleic acid, fumaric acid, dichlormaleic acid, methylmaleic acid and diethylmaleic acid.

Also of special interest, particularly because of the improved flame resistant properties of the products derived therefrom, are the phosphorus-containing acids, and particularly inorganic and organo-substituted acids containing pentavalent phosphorus, such as phosphoric acid, phosphonic acids as benzenephosphonic acid, butanephosphonic acid, cyclohexanephosphic acid, trichloromethanephosphonic acid, and the like.

The ethylenically unsaturated alcohols used in the production of the acid esters are those possessing at least one polymerizable ethylenic linkage in the molecule, such as allyl alcohol, methallyl alcohol, 3-buten-1-ol, 4-chloro- 3-buten-1-ol, 4-hexen-1-ol, 5-cyclohexyl-3-hexen-1-ol, and the like.

A preferred group of the unsaturated monohydric alcohols comprises the beta, gamma monoethylenically unsaturated monohydric alcohols containing from 3 to 18 carbon atoms. These alcohols are sometimes referred to as allyl-type alcohols. They may be exemplified by allyl alcohol, crotyl alcohol, tiglyl alcohol, 3-chloro-2-buten-1-ol, cinnamyl alcohol, 2,4-hexadien-1-ol, 2-methyl-2-hexen-1-ol, 5-chloro-2-octen-1-ol, 3-cyclohexyl-2-octen-1-ol, 4-phenyl-2-hepten-1-ol, 2,4-dichloro-2-hexen-1-ol, and 3-ethyl-2-octen-1-ol. Of particular value are the 2-alkenols and chloro-substituted 2-alkenols containing no more than 8 carbon atoms.

The unsaturated acid esters may be prepared by the esterification of any of the above-described polybasic acids with any one or more of the above-described ethylenically unsaturated alcohols. Examples of these unsaturated acid esters include, among others, allyl hydrogen maleate, methallyl hydrogen fumarate, allyl hydrogen benzenephosphonate, allyl hydrogen butanephosphonate, dimethallyl hydrogen phosphate, diallyl hydrogen phosphite, allyl hydrogen phthalate, chloroallyl hydrogen ethallyl hydrogen adipate, 2-butyl-3-butenyl hydrogen succinate, allyl hydrogen methoxy-succinate, methallyl hydrogen oxalate, diallyl hydrogen phosphate, triallyl hydrogen silicate, diallyl hydrogen borate, 3-ethyl-4-octenyl hydrogen glutaconate, chloroallyl hydrogen itaconate, allyl hydrogen cyclohexane-carboxylate, ethallyl hydrogen 4-cyclohexene-1,2-carboxylate, 5-cyclohexyl-2-heptenyl hydrogen maleate, chloroallyl-2-chloromaleate, 3-ethyl-1-cyclohexenyl hydrogen thiodipropionate, allyl hydrogen oxydipropionate, diallyl hydrogen citrate, the allyl half-ester of dimerized linoleic acid, diallyl hydrogen 1,2,4-butanetricarboxylate, methallyl hydrogen isophthalate, allyl hydrogen dinicotinate, allyl hydrogen benzenephosphonate, and the like.

The preferred acid esters, i. e., those derived from the polycarboxylic acids containing no more than 20 carbon atoms, and particularly the aliphatic dicarboxylic acids and the aromatic dicarboxylic acids, and the beta, gamma-monoethylenically unsaturated alcohols may be exemplified by allyl hydrogen maleate, chloroallyl phthalate, ethallyl hydrogen isophthalate, allyl hydrogen dichloromaleate, ethallyl hydrogen fumarate, allyl hydrogen adipate, allyl hydrogen terephthalate, methallyl hydrogen diethylmaleate, allyl hydrogen malonate, allyl hydrogen glutaconate, methallyl hydrogen chlorophthalate and methallyl hydrogen succinate.

The esters derived from the above-described specially preferred acids, i. e., the ethylenically unsaturated polycarboxylic acids and the phosphorus-containing acids, may be exemplified by allyl hydrogen maleate, allyl hydrogen fumarate, allyl hydrogen dichloromaleate, allyl hydrogen methylmaleate, allyl hydrogen benzenephosphonate, allyl hydrogen cyclohexanephosphonate, allyl hydrogen chlorobutanephosphonate and dimethallyl hydrogen phosphate.

The above-described unsaturated acid esters may be prepared by a variety of methods known to the art. They are preferably prepared by merely reacting the desired polybasic acid or corresponding anhydride with the desired alcohol and removing any of the water formed during the reaction, preferably by distillation. Esterification catalysts, such as p-toluene-sulfonic acid, boron and silicon fluorides, monosodium sulfate, and the like, in amounts varying from about 0.1% to 5% by weight may be used if desired, but generally such catalysts are not needed to effect the desired partial esterification of the polybasic acids. The amount of the polybasic acid or anhydride and the unsaturated alcohols should be selected so that the resulting product still possesses at least one free carboxyl group. In preparing acid esters from the dicarboxylic acids or their anhydrides and the ethylenically unsaturated alcohols, for example, two mols of the acid or anhydride would be reacted with approximately one mol of the unsaturated alcohol. The esterification is preferably accomplished in the presence of solvents or diluents, such as benzene, toluene, cyclohexane, and the like, but these materials may be eliminated if desired. As the resulting acid esters are polymerizable, it may be desirable in some cases to employ polymerizable inhibitors, such as copper bronze powder, hydroquinone, in the reaction mixtures. These inhibitors may be subsequently removed by washing, distillation and the like. Temperatures employed in the esterification vary generally from about 70° C. to 200° C. and more preferably from about 80° C. to 100° C. The acid esters may be recovered by any suitable method, such as distillation, extraction, precipitation and the like.

The hydroxy-substituted unsaturated esters of the present invention may be prepared by combining any one of the above-described polyepoxides with any one or more of the above-described unsaturated acid esters. In most instances, the reaction between the polyepoxides and the acid ester will take place at or near room temperature. However, in some cases it may be desirable to apply heat in order to obtain a satisfactory reaction rate. Preferred temperatures range from room temperature up to about 150° C. with a more preferred range being between 40° C. and 80° C. The reaction may be conducted at atmospheric, superatmospheric or subatmospheric pressures as desired.

The proportions in which the polyepoxide and unsaturated acid esters are combined may vary over a wide range depending upon the properties desired in the finished product. If products having all of the epoxy groups converted to hydroxy-ester groups are desired, the polyepoxide should be reacted with at least a chemical equivalent amount of the unsaturated ester. The expression "chemically equivalent" as used herein in reference to the polyepoxide and unsaturated acid ester refers to the amount required to furnish one epoxide group for every carboxyl group attached to the unsaturated ester molecule. Preferably the polyepoxides and acid esters are combined in chemically equivalent ratio varying from 1:3 to 1:1. If products having residual epoxide groups are desired, an equivalent of the polyepoxide should, of course, be reacted with less than a chemically equivalent amount, such as .5 to .75 equivalent, of the acid ester. If it is desired to produce derivatives of the products wherein the hydroxy groups formed by the opening of the epoxy ring are esterified with the unsaturated ester, one may also employ an excess of the acid ester, e. g., .5 to 2 equivalent excess, and continue the reaction, preferably at higher temperatures and in the presence of known esterification catalysts until the said hydroxyl groups have been esterified.

The reaction between the polyepoxide and the unsaturated acid ester may be conducted in the presence or absence of solvents or diluents. The solvent if employed may be a solvent for the reactants and the resulting esters or a solvent for the reactants and a non-solvent for the resulting esters. Suitable solvents include, among others, toluene, benzene, dioxane, ethyl alcohol, tetrahydrofuran, methyl ether of ethylene glycol monoacetate, ether, and the like and mixtures thereof.

At the completion of the reaction, the hydroxy-substituted unsaturated esters may be recovered by a variety of methods obvious to the art, such as solvent extraction, filtration, precipitation, distillation, and the like.

The hydroxy-substituted unsaturated esters of the invention will vary from viscous liquids to solids depending upon the type of materials and proportions of reactants employed. The hydroxy-substituted polyunsaturated esters possess good air-drying properties and may be cured to form hard films. In addition, these products have good solubility in many oils and solvents and good compatibility with various synthetic resins, as vinyl polymers, cellulose ethers and esters and the like. They are therefore of great value in the preparation of varnishes and paints and other types of coating compositions. The liquid hydroxy-substituted polyunsaturated esters, and particularly those prepared from the glycidyl ethers of the polyhydric phenols or polyhydric alcohols, generally have viscosities such that they may be used directly as varnishes without the use of additional solvents or diluents. They are particularly valuable and useful as hardening agents for laminating compositions containing polyesters, styrene modified polyesters, urea resins, phenolic resins, and are useful as curing agents for acrylic rubbers.

The hydroxy-substituted unsaturated esters of the present invention may also be further reacted through the hydroxyl groups and/or ethylenic linkages or residual epoxy groups to produce valuable derivatives. The hydroxy-substituted unsaturated esters may, for example, be reacted with monocarboxylic acids, such as acetic acid, butyric acid, caproic acid, capric acid, 2-ethylhexanoic acid, lauric acid, stearic acid, benzoic acid, cyclohexanoic acid, tert-butyl benzoic acid and isopropyl benzoic acid to produce ester derivatives which are valuable as plasticizers and lubricants.

The hydroxy-substituted unsaturated esters of the present invention may also be reacted with polyethylenically unsaturated monocarboxylic acids to produce products having value in the preparation of varnishes, paints and the like. Examples of such acids include rosin acids, as abietic acid, acids from linseed, soyabean, perilla, piticia, tung, walnut, dehydrated castor oil, as well as the lower fatty acids, such as pentadienoic acid, hexadienoic acid and the like.

The hydroxy-substituted unsaturated esters may also be reacted with polyfunctional agents. Materials useful for this purpose include the diisocyanates, such as methylene bis(4-phenyl isocyanate), hexamethylene diisocyanate, polycarboxylic acids, and polycarboxylic acid anhydrides, such as phthalic acid, phthalic anhydride, succinic acid, adipic acid, malonic acid, maleic acid, and various resinous products, such as aminealdehydes or amide-aldehyde type resins, such as those prepared from formaldehyde and amide or amines as urea, thiourea, phenyl thiourea, and the like. The amount of these agents employed will depend upon the type of resinous product and agent selected, but in most cases, the desired hard infusible products may be obtained by using the agents in amounts varying from .1% to 40% by weight, and more preferably, from .1% to 10% by weight.

The mixtures containing the hydroxy-substituted unsaturated esters and the above-described polyfunctional agents are of value in the preparation of baking enamels, pottings and castings and in the formation of various shaped articles. In the preparation of castings and pottings from these materials, it is generally desirable to combine the hydroxy-substituted unsaturated esters with the curing agent, and then pour this mixture into the mold or casting and then apply heat until the mixture has set to a hard resin.

The polyesters prepared from the hydroxy-substituted unsaturated esters and the polycarboxylic acids or anhydrides are particularly valuable in the preparation of laminating compositions which may be applied to glass, wood, cloth, paper and the like. Modified polyesters described below are particularly good for these applications.

The products of the invention may also be polymerized by themselves or with other ethylenically unsaturated monomers to produce a variety of valuable polymeric products. Monomers that may be copolymerized with the products of the invention include those containing a $CH_2=C=$ group, such as styrene, alpha-methylstyrene, dichlorostyrene, and vinyl naphthalene; the alkyl esters of the mono- and polycarboxylic unsaturated acids as methyl acrylate, methyl methacrylate, butyl methacrylate and propyl acrylate, dimethyl maleate, dibutyl fumarate and dihexyl maleate; the alkenyl esters of the saturated monocarboxylic acids as allyl acetate, methallyl butyrate, vinyl benzoate, vinyl valerate and vinyl caproate; the vinylidene halides as vinylidene chloride and vinylidene fluoride; the vinyl halides as vinyl chloride and vinyl bromide; the vinyl esters of hydrocyanic acid as acrylonitrile and methacrylonitrile; the vinyl ethers as vinyl ethyl ether, vinyl butyl ether, allyl octyl ether, and the vinyl ketones, such as vinyl butyl ketone, vinyl ethyl ketone, and the like. These dissimilar monomers are generally employed in amounts varying from .1% to 40% by weight, but in some cases may be employed in amounts varying up to about 80% by weight of the total reactants.

The polymerization may be effected by heating the hydroxy-substituted unsaturated esters or the mixtures containing these esters in the presence of a free radical yielding catalyst, in bulk, solvent solution or in aqueous emulsion or suspension systems. Catalysts that may be used for the polymerization are preferably the peroxide catalysts, such as benzoyl peroxide, lauryl peroxide, tertiary butyl hydroperoxide, 2,2-di(tertiary butyl peroxy)-butane, di(tertiarybutyl)peroxide, tertiary butyl perlargonate, potassium persulfate, and the like. The amount of the catalyst added will preferably vary from about .1% to about 5% by weight of the reactants. Temperatures employed in the polymerization may vary over a considerable range but are preferably those within the range of about 65° C. to 250° C. Particularly preferred temperatures range from about 65° C. to 100° C. The polymerization may be conducted in the presence or absence of air. In most cases, however, it is generally desirable to conduct the polymerization in the absence of air, such as in the presence of inert gases, such as nitrogen.

The homopolymers and copolymers of the products of the invention are of value as additives for coating and impregnating compositions and in the preparation of laminated articles and rigid plastic articles.

The hydroxy-substituted unsaturated esters and their derivatives and particularly the monocarboxylic acid ester derivatives, are of special value as polymerizable plasticizers for vinyl polymers such as the vinyl chloride polymers. When polymerized in the presence of these polymers, the resulting compositions are very hard and tough but still highly flexible. When utilizing the products of the invention in this capacity, one may mix the unsaturated esters with the vinyl polymer and a small amount of the peroxide catalyst on a heated roll mill to form a calendered sheet, or the unsaturated esters may be mixed with a finely-divided vinyl polymer and the peroxide catalyst to form a fluid plastisol or organosol mixture and this mixture may then be spread out as film and heated to a polymerizing temperature.

In the above role as a polymerizable plasticizer, the products of the invention may be used by themselves or in combination with known plasticizing agents, such as dioctyl phthalate, tricresyl phosphate, dinonyl phthalate, dibutyl sebacate, dibenzyl sebacate, butyl octyl phthalate, polyethylene glycol sebacate, and the like.

The amount of the unsaturated ester to be added to the vinyl polymer will vary over a wide range depending upon the type of product desired and process employed. If the vinyl polymers are to be used to produce calendered sheets or rigid molded articles, the amount of the polymerizable ester may vary generally from about 30 parts to 120 parts per 100 parts of polymer. Preferably, the amount of the polymerizable plasticizer will vary from 40 to 80 parts per 100 parts of polymer. If other types of plasticizing agents are employed, these proportions can be reduced considerably. In the preparation of plastisol and organosol compositions, the amount of the polymerizable ester wil generally vary from 50 parts to 150 parts per 100 parts of polymer. These amounts may also be reduced by employing the above-described secondary plasticizers along with the unsaturated esters.

To illustrate the manner in which the invention may be carried out, the following examples are given. It is to be understood that the examples are for the purpose of illustration and the invention is not to be regarded as limited to any of the specific compounds or conditions recited therein. Unless otherwise specified, parts disclosed in the examples are parts by weight.

*Example I*

About 40 parts of allyl hydrogen maleate prepared by adding one mol of allyl alcohol to 2 mols of maleic anhydride was added to 100 parts of poly(allyl glycidyl ether) polymer F described above, and the mixture slowly stirred at room temperature. The resulting product was a clear, colorless viscous liquid.

A drier containing .25 part of cobalt naphthenate and .08 part of lead naphthenate was added to 40 parts of the above-described poly(allyl glycidyl ether)-allyl hydrogen maleate reaction product. After standing for a short period, the mixture was spread on glass plates and tin panels and the coated plates and panels placed in an oven at 180° C. The resulting films were very hard and flexible and were comparable to film baked from alkyds made with drying oils.

About .25 part of benzoyl peroxide was added to 40 parts of the polyglycidyl ether-allyl hydrogen maleate reaction product produced above and the mixture placed in an oven at 100° C. Under these conditions, the mixture set up rapidly to a hard rubbery resin.

About 5.5 parts of styrene was added to 40 parts of the above-described poly(allyl glycidyl ether)-allyl hydrogen maleate and the mixture placed in an oven at 100° C. Under these conditions, the mixture set up to a hard rubbery product.

*Example II*

About 81 parts of allyl hydrogen maleate was added to 100 parts of a glycidyl ether of bis-phenol (polyether A described above) and the mixture slowly stirred and heated intermittently for one and a half hours at 100° C. and then allowed to cool. The resulting product was a clear, viscous liquid.

A drier containing .25 part of cobalt naphthenate and .08 part of lead naphthenate was added to 40 parts of the above-described reaction product. After standing for a short period, the mixture was spread on glass plates and tin panels and the coated plates and panels placed in an oven at 180° C. The resulting films were very hard and flexible.

About .25 part of benzoyl peroxide was added to 40 parts of the polyether A-allyl hydrogen maleate reaction product produced above and the mixture placed in an oven at 100° C. Under these conditions, the mixture set up to a hard resin.

*Example III*

About 88 parts of allyl hydrogen maleate was added to 250 parts of polyether C described above and the mixture heated on a hot plate for two hours at 100–110° C. and then cooled. The resulting product was a colorless, very viscous liquid.

A drier containing .25 part of cobalt naphthenate and .08 part of lead naphthenate was added to 40 parts of the above-described reaction product. After standing for a short period, the mixture was spread on tin panels and the panels placed in an oven at 180° C. The resulting films were very hard and flexible.

Similar results are obtained by replacing the allyl hydrogen maleate in the above procedure with equivalent amounts of allyl hydrogen fumarate, allyl hydrogen methylmaleate and allyl hydrogen dichloromaleate.

*Example IV*

About 25 parts of a glycidyl ether of a novolac resin (polyether E prepared as shown above) was mixed with 19.5 parts of allyl hydrogen maleate and the mixture slowly stirred at 40° C. The resulting product was a colorless viscous liquid.

Films of the above-described reaction product were spread on glass plates using a 7 mil doctor blade. The plates were than cured at 220° C. for ½ hour to form very hard and tough films.

The above experiment was repeated using 25 parts of the polyether E and 9.8 parts of the allyl hydrogen maleate. The films obtained in this case were also very hard and tough.

*Example V*

About 31.2 parts of allyl hydrogen maleate was added to 49.5 parts of epoxidized soybean oil and the mixture heated together at 27° C. for a short period. The resulting product was a colorless viscous liquid.

Films of the above-described reaction product were spread on glass plates using a 7 mil doctor blade. The plates were then placed in an oven at 220° C. for ½ hour. The resulting films were relatively hard and very flexible.

Similar results were obtained by using a reaction product of 24.75 parts of allyl hydrogen maleate and 8 parts of epoxidized soybean oil.

*Example VI*

The polyether E-allyl hydrogen maleate reaction product produced in Example IV and the soybean-oil-allyl hydrogen maleate reaction product produced in Example V were combined with two parts of each of the following unsaturated monomers and ½ part of di-tert-butyl peroxide and the mixture heated at 100° C. The results obtained are disclosed in the following table:

| Reaction Product | Monomer | Catalyst | Product |
|---|---|---|---|
| Polyether E—Allyl hydrogen maleate. | Vinyl acetate | di-tert-butyl peroxide. | hard resin having Barcol hardness 40–50. |
| Do | Acrylonitrile | do | clear resin having Barcol hardness 45–55. |
| Do | Methyl methacrylate. | do | clear resin having Barcol hardness of 35. |
| Epoxidized soybean oil—Allyl hydrogen maleate. | Vinyl acetate | do | hard rubbery resin. |
| Do | Acrylonitrile | do | rubbery resin. |
| Do | Methyl methacrylate. | do | tough rubbery resin. |

All of the products shown in the last column were boiled in water for fifteen minutes and none showed any marked change. The acrylonitrile modified polyether E-allyl hydrogen maleate product showed particularly good resistance to water.

*Example VII*

About 20.6 parts of allyl hydrogen phthalate was added to 17.0 parts of poly(allyl glycidyl ether) and the mixture stirred at room temperature. The resulting product was a clear, colorless viscous liquid.

The reaction product produced above was then spread on glass panels and cured at 230° C. for ½ hour. The resulting films were very hard and tough and highly flexible.

*Example VIII*

About 25 parts of allyl hydrogen phthalate was added to 23.9 parts of polyether A produced above and the mixture stirred at room temperature. The resulting product was a clear viscous liquid.

Films of the above-described reaction product were spread on glass panels and cured in an oven at 230° C. for ½ hour. The resulting films were very hard and flexible.

*Example IX*

Two mols of allyl hydrogen maleate are added to 1 mol of vinyl cyclohexene dioxide and the mixture stirred at room temperature. The resulting product is a clear viscous liquid.

Films of the above-described reaction product are spread on glass panels and cured in an oven at 230° C. for ½ hour. The resulting films are relatively hard and flexible.

*Example X*

One mol of polyether A is combined with approximately 2 mols of allyl hydrogen benzene phosphonate and the mixture stirred at room temperature. The resulting product is a clear viscous liquid.

Films of the above-described reaction product are spread on glass panels and cured in an oven at 230° C. The cured films obtained are very hard and flexible.

Similar results can be obtained by replacing the allyl hydrogen benzene phosphonate with equivalent amounts of methallyl hydrogen cyclohexane phosphonate, diallyl hydrogen phosphate and allyl hydrogen butanephosphonate.

*Example XI*

One mol of the polyether A-allyl hydrogen maleate reaction product produced as shown in Example II is reacted with a double molar quantity of acetic anhydride to form the diacetate. 50 parts of the product is then combined with 100 parts of polyvinyl chloride and 3 parts of benzoyl peroxide and the mixture milled together at a temperature between 100° C. and 150° C. for a few minutes. The resulting product is a hard tough sheet which has good flexibility.

I claim as my invention:

1. A hydroxy-substituted unsaturated ester obtained by reacting at a temperature between about room temperature and about 150° C. a polyepoxide having more than one

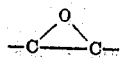

group with an acid ester of (1) a polybasic acid and (2) an ethylenically unsaturated alcohol, said hydroxy-substituted unsaturated ester containing a characteristic structural grouping

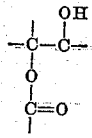

and in said reaction the polyepoxide and acid ester being combined in a ratio which varies from that needed to furnish one epoxy group per carboxyl group to that needed to furnish one epoxy group per 0.5 carboxyl group.

2. A hydroxy-substituted unsaturated ester as defined in claim 1 wherein the polyepoxide has a

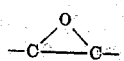

epoxy equivalency greater than 1.0 and a molecular weight between 125 and 3000.

3. A hydroxy-substituted unsaturated ester as defined in claim 1 wherein the polyepoxide is a polyepoxy polyether of a polyhydric phenol having a

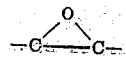

epoxy equivalency greater than 1.0 and a molecular weight between 200 and 3000.

4. A hydroxy-substituted unsaturated ester obtained by reacting at a temperature between about room temperature and about 150° C. a polyepoxy polyether of a dihydric phenol having a

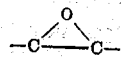

epoxy equivalency between 1.1 and 2.5 and a molecular weight between 200 and 1800 with an acid ester of (1) an ethylenically unsaturated polycarboxylic acid and (2) an ethylenically unsaturated monohydric alcohol containing no more than 15 carbon atoms, said hydroxy-substituted unsaturated ester containing a characteristic structural grouping

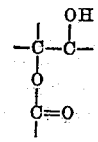

and in said reaction the polyepoxy polyether and the acid ester being combined in a ratio which varies from that needed to furnish one epoxy group per carboxyl group to that needed to furnish one epoxy group per 0.5 carboxyl group.

5. A hydroxy-substituted unsaturated ester as defined in claim 4 wherein the polyepoxy polyether is a glycidyl polyether of 2,2-bis(4-hydroxyphenyl)propane.

6. A hydroxy-substituted unsaturated ester as defined in claim 4 wherein the acid ester is a member of the group consisting of allyl and methallyl acid esters of maleic acid, fumaric acid and chloro- and alkyl-substituted derivatives of maleic and fumaric acid.

7. A hydroxy-substituted unsaturated ester obtained by reacting at a temperature between about room temperature and about 150° C. a polyepoxide having a

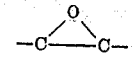

equivalency greater than 1.0, with an acid ester of (1) an ethylenically unsaturated polycarboxylic acid and (2) an ethylenically unsaturated monohydric alcohol containing no more than 18 carbon atoms, said hydroxy-substituted unsaturated ester containing a characteristic structural grouping

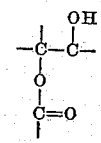

and in said reaction the polyepoxide and acid ester being combined in a ratio which varies from that needed to furnish one epoxy group per carboxyl group to that needed to furnish one epoxy group per 0.5 carboxyl group.

8. A hydroxy-substituted unsaturated ester as defined in claim 7 wherein the polyepoxide is an epoxidized soybean oil.

9. A hydroxy-substituted unsaturated ester obtained by reacting at a temperature varying from about room temperature to 80° C. a glycidyl polyether of a formaldehyde-phenol reaction product having a

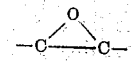

epoxy equivalency greater than 1.0, with an acid ester of (1) an ethylenically unsaturated polycarboxylic acid and (2) an ethylenically unsaturated monohydric alcohol containing no more than 18 carbon atoms, said hydroxy-substituted unsaturated ester containing a characteristic structural grouping

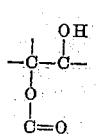

and in said reaction the glycidyl polyether and the acid ester being combined in a ratio which varies from that needed to furnish one epoxy group per carboxyl group to that needed to furnish one epoxy group per 0.5 carboxyl group.

10. A hydroxy-substituted unsaturated ester obtained by reacting at a temperature varying from about room temperature to 80° C. a polymer of an allyl glycidyl ether having a

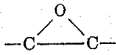

epoxy equivalency greater than 1.0 with an acid ester of (1) an ethylenically unsaturated polycarboxylic acid and (2) a beta,gamma-monoethylenically unsaturated aliphatic monohydric alcohol containing from 3 to 10 carbon atoms, said hydroxy-substituted unsaturated ester containing a characteristic structural grouping

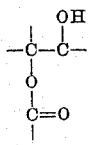

and in said reaction the polymer of allyl glycidyl ether and the acid ester being combined in a ratio which varies from that needed to furnish one epoxy group per carboxyl group to that needed to furnish one epoxy group per 0.5 carboxyl group.

11. A hydroxy-substituted unsaturated ester obtained by reacting at a temperature varying from about room temperature to 80° C. poly(allyl glycidyl ether) with allyl hydrogen maleate, said hydroxy-substituted unsaturated ester containing a characteristic structural grouping

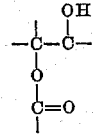

and in said reaction the poly(allyl glycidyl ether) and the allyl hydrogen maleate being combined in a ratio which varies from that needed to furnish one epoxy group per carboxyl group to that needed to furnish one epoxy group per 0.5 carboxyl group.

12. A hydroxy-substituted unsaturated ester obtained by reacting at a temperature varying from about room temperature to 80° C. a glycidyl ether of 2,2-bis(4-hydroxyphenyl)propane with allyl hydrogen maleate, said hydroxy-substituted unsaturated ester containing a characteristic structural grouping

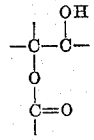

and in said reaction the glycidyl ether and the allyl hydrogen ester being combined in a ratio which varies from that needed to furnish one epoxy group per carboxyl group to that needed to furnish one epoxy group per 0.5 carboxyl group.

13. A hydroxy-substituted unsaturated ester obtained by reacting at a temperature varying from about room temperature to 80° C. a glycidyl ether of glycerol with allyl hydrogen phthalate, said hydroxy-substituted unsaturated ester containing a characteristic structural grouping

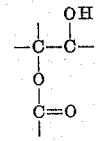

and in said reaction the glycidyl ether and the allyl hydrogen ester being combined in a ratio which varies from that needed to furnish one epoxy group per carboxyl group to that needed to furnish one epoxy group per 0.5 carboxyl group.

References Cited in the file of this patent
UNITED STATES PATENTS

| | | |
|---|---|---|
| 2,478,015 | Rust et al. | Aug. 2, 1949 |
| 2,504,518 | Greenlee | Apr. 18, 1950 |
| 2,575,440 | Bradley | Nov. 20, 1951 |
| 2,592,560 | Greenlee | Apr. 15, 1952 |
| 2,618,616 | Tess et al. | Nov. 18, 1952 |